Patented Jan. 10, 1939

2,143,388

UNITED STATES PATENT OFFICE

2,143,388

MANUFACTURE OF HYDROXYALKYLATED NITROGEN BASES

Paul Schlack, Berlin-Treptow, Germany, assignor to I. G. Farbenindustrie Aktiengesellschaft, Frankfort-on-the-Main, Germany, a corporation of Germany No Drawing. Application December 5, 1935, Serial No. 53,003. In Germany November 30, 1934

10 Claims. (Cl. 260—584)

This invention relates to the manufacture of hydroxyalkylated nitrogen bases.

One of its objects is a process of producing hydroxyalkylated nitrogen bases. Another object is the new hydroxyalkylated nitrogen bases. Further objects will be seen from the detailed specification following hereafter.

The production of aminoalkyl esters of inorganic acids, particularly of the hydrogen halides, frequently does not run smoothly because secondary reactions especially chain formation in different directions, are apt to occur. This disadvantage becomes especially noticeable when ammonia, amines or amine derivatives and particularly polyamines, especially those which contain one or more hydrogen atoms capable of being displaced are reacted with an epihalogenhydrine or a similar substance which, in addition to an alkyleneoxide radical, or a radical which under the conditions of working is apt to react with intermediate formation of alkyleneoxide, still contains one or more further groups capable of reacting with an amine. By bringing together the components in molecular proportions, for example in an organic solvent, the reaction is generally far from unitary. In complicated cases, particularly with polyamines, there are obtained mixtures of different substances which cannot be separated or can only be separated with difficulty. Reliable statements on the subject are scarce in literature.

On the laboratory scale it is in many cases possible to obtain a comparatively unitary course of reaction by maintaining definitely limited conditions, but in each case the production on a large scale meets with considerable difficulties.

The present invention relates to a process in which the reaction between an amine and an ester of an inorganic acid with an oxido-hydroxy-compound is rendered considerably smoother and more unitary by using in the reaction instead of the amine a salt thereof with an inorganic or an organic acid. As a solvent for these salts water must be put in the first line. If desired, however, an organic solvent, such as chloroform, acetone, ethyl acetate, dioxane or alcohol may be used, or a mixture of an organic solvent with water. It is generally preferred to operate in the presence of water. Usually the reaction proceeds without application of heat when the aqueous solution is shaken or stirred with the alkyleneoxide. In other cases there may be a rise of temperature amounting to 40 to 50° C. or even to 90° C. It may be remarked, however, that with rising temperature the hydrolysis of the alkylene oxides is accelerated, so that a more or less large excess of an alkylene-oxide compound may be necessary. Higher temperatures are indicated when alkylene-oxides sparingly soluble in water are used; and when the aqueous salt solution used is relatively concentrated, whereby the solubility of the oxide in such solution is diminished. In organic solvents in which hydrolysis practically does not occur it is obvious that higher temperatures may be employed without disadvantage.

It is of particular importance that, as has been ascertained, the reaction proceeds to the formation of quaternary salts. These salts are produced almost exclusively in case a sufficiency of alkylene-oxide is present. Quaternary salts are also produced when salts of tertiary amines are used. From mixtures which contain primary and secondary bases, these can, and in some cases, must be separated by known methods, for example by conversion into a nitroso-compound or an acyl-derivative with the aid of, for example, acetic anhydride, paratoluenesulfochloride or phenylisothiocyanate.

When using on a large scale alkylene oxides which are sparingly soluble in aqueous salt solution or water it is preferable to add an emulsifying agent, for instance a condensation product from an aliphatic alcohol and a polyglycol, sodium sulfopalmitate, sodium isobutylnaphthalenesulfonate, diethylamino-ethyloleic acid-amide-hydrochloride and/or a protective colloid, such as hydroxyethyl-cellulose or gum arabic. In order to facilitate the dispersion the epihalogenhydrin may be diluted with an indifferent organic solvent of low specific gravity, for instance benzene or methylal.

The anions of the amine salts may be selected as desired but those are generally preferred which yield very easily soluble salts, for instance, the anion of acetic acid, lactic acid, tartaric acid, nitric acid, or halogenhydracids, particularly if the product of reaction or the corresponding free base is not insoluble in water and can be separated, for example by means of potassium carbonate. Particularly advantageous are the salts of hydrogenhalides and of sulfocyanic acid, since the anions of these acids accelerate the reaction energetically. The presence of halogen-ions may, indeed, have particular value for the practical result. It is also possible to use a mixture of salts having different anions or to add to a salt with an anion not belonging to the group of the hydrogen halides a salt of a hydrogen-halide in order to obtain a catalytic effect of these ions. The anion may also be, exclusively or in part, of capillary active or hydrotropic character, whereby dispersion or dissolution of the oxide is facilitated. There may be named in this connection the anions of the alkyl-sulfonic acids of high molecular weight, of the alkylnaphthaenesulfonic acids, of the tetrahydronaphthalenesulfonic acid or of the toluene-thiosulfonic acids. The reaction is even smoother when the base is not completely neutralized or if a strongly dissociated salt of a feeble acid, for example acetic acid or oleic acid, is present. There may also be added to the solution of an amine salt a small proportion of a base which does not react of itself. The transformation, however, is not confined to an alkaline reaction of the medium. It may start also in the presence of an excess of acid, for example, hydrochloric acid. In this case part of the acids is chemically bound by the alkylene oxide with formation of an ester, whereby the reaction mixture gradually becomes alkaline.

The invention is not limited to the use of ammonia and simple primary, secondary and tertiary amines but extends equally to polyamines and amino-derivatives, such as amino-alcohols, amino-aldehydes, amino-carboxylic-acids, aminosulfonic acids, quite generally to nitrogenous bases containing strongly basic nitrogen. Particularly valuable products are obtained by starting from amines and amine derivatives of high molecular weight containing radicals having more than 6 carbon atoms, for instance, dodecylamine, dodecyldiethylenetriamine, β-aminoethyl-oleylamide, the amine derivatives of chlorinated paraffins of high molecular weight or the like. To the bases which are suitable for the process belong also the basic derivatives of carbonic acid such as guanidine, ethers of iso-urea, ethers of iso-thiourea, furthermore salts of hydroxylamines or hydrazines and their alkyl derivatives. The process is also applicable to aromatic amines, although it is primarily the strongly basic aliphatic, alicyclic or heterocyclic nitrogenous bases that come into question.

The mixture from the reaction may be used directly without isolating the body produced, particularly in the textile industry and the allied branches of chemical technology. It can also be brought into reaction, with or without isolation of the primary product, with the substance suitable for reaction with active halogen, for instance with an amine, a monohydric- or polyhydric alcohol, an alcoholate, a mercaptide, a phenolate, a carbonate, a sulfide, a sulfite, a thiosulfate; an amino-acid, a peptide or a protein. Again, reagents that react with hydroxyl-groups may be brought into reaction on the hydroalkyl products, for instance concentrated sulfuric acid, chlorosulfonic acid, phosphoric acid, a phosphorous halide, an alkylene oxide of low molecular weight, an aldehyde or aldehydic acid. The reaction product may further be converted into the corresponding oxide by the action of agents which eliminate acids. The extraordinarily reactive transformation products thus obtained are, like the parent materials, valuable intermediate products in the manufacture of textile assistants. They may also be used with advantage in order to introduce into substances of high molecular weight, which contain —OH, —NH, —NHR or —SH groups, basic radicals in the form of aminohydroxyalkyl, or in the form of basic ester groups or basic ether groups; so far as oxide-groups remain in such reactions, these may still be caused to react subsequently with suitable components, such as amines, bisulfites, sulfur dioxide, hydrogen halide, sulfuric acid or the like. On the other hand it is also possible to transform compounds having several halogen alkoxy groups and analogous groups noly partially into oxide, so that a part of the halogen-hydroxyalkyl-groups remains. These bodies may be combined, first with splitting of the oxide ring, with substances capable of reaction having active hydrogen, for instance phenols or carboxylic acids. Hereupon the organically bound halogen may be exchanged for any substituent, for instance for NH—CH₂COOH, NR—CH₂—CH₂—SO₃H, —SO₃H, —NH₂ or —NR₂, —NHCH₂.CH₂NH₂, —N(CH₃)₃ Cl,

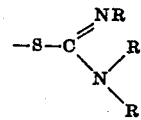

(R=H or an organic radical).

Particularly valuable and capable of transformation are the products which contain in the molecule at least two hydroxyalkyl groups containing inorganic ester radicals as substituents, for example the products of the action of 2 or 3 mol. epichlorhydrin on salts of primary or secondary monamines or of the action of 4–6 mol. epichlorhydrin on salts of di-primary diamines. Also from tertiary monamines, quaternary ammonium salts may be produced having two groups of this kind, whereby a radical having little affinity is displaced. Some quaternary salts which contain the chlorhydroxypropyl radical have the property to part easily with the chlorhydroxypropyl group while splitting off epichlorhydrine. They can therefore in some cases be used at the place of epichlorhydrine as an agent for introducing the chlorhydroxypropyl group. For instance, this holds true of the quaternary salts of ammonium chloride or ethylendiammonium chloride an excess of epichlorhydrine.

The following examples illustrate the invention:

*Example 1.*—1 mol. piperidine is neutralized with 9/10 mol. 5-N-hydrochloric acid and the solution is shaken at 40° C. with 1 mol. epichlorhydrin. The oxide disappears rather quickly. The colorless, clear solution should contain, according to the titration values, about 50 per cent. of the hydrochloride of chlorohydroxypropylpiperidine, about 25 per cent. of piperidine hydrochloride and about 25 per cent. of dichlorohydroxypropylpiperidinium chloride.

*Example 2.*—A solution of 13.3 parts by weight of ethylenediamine-dihydrochloride in 50 parts of water is shaken with 55.5 parts of epichlorhydrin (6 mol.) for 16 hours at room temperature. There is obtained a colorless, feebly alkaline solution which no longer contains epichlorhydrin. The product can be condensed with casein in a solution of borax.

A similar solution is obtained by using only ⅔ of the prescribed quantity of epichlorhydrin.

*Example 3.*—A solution of 55.42 parts by weight of dodecylamine-hydrochloride in 500 parts of water is mixed with 46.25 parts of epichlorhydrin (2 mol.) at 50° C. The epichlorhydrin disappears almost immediately and the previously turbid solution becomes as clear as water. The product can be separated by addition of potassium carbonate and then extracted with ether. By reaction with an amine, for example dimethylamine, if desired with subsequent alkylation there is obtained a valuable textile assistant. One may also conduct the process with 3 mol. epichlorhydrin.

*Example 4.*—A solution of piperidineacetate in water is shaken with epichlorhydrin until the odor of the latter has disappeared. The product may be condensed with dodecylamine.

*Example 5.*—An aqueous normal solution of the tetrahydroxyethylethylenediamine hydrochloride is shaken with 2 mol. epichlorhydrin over-night at room temperature. Epichlorhydrin can no longer be identified in the mixture. The solution contains preponderatingly the diquaternary salt. The tertiary portion still present may be transformed into the quaternary by reaction with dimethylsulfate or with hydrogen peroxide.

Example 6.—An aqueous normal solution of triethylenetetramine hydrochloride is shaken with 10 mol. epichlorhydrin for about 16 hours at 25–30° C. The epichlorhydrin is no longer recognizable in the feebly yellow, clear liquid. The nitrogen in the product is for the greater part in the pentavalent form.

Example 7.—Glycocoll is shaken with a normal solution of 3 mol. epichlorhydrin for several days. The epichlorhydrin completely disappears without leaving a residue. The solution contains in high proportion the corresponding betaine. If only one mol. epichlorhydrin is used there is formed practically no betaine. Instead of glycocoll other internal salts, such as taurine, may be used.

Example 8.—Ammonium chloride is shaken at room temperature for several days with 4 mol. epichlorhydrin until the latter has been consumed. There is obtained a completely colorless solution which, according to the titration, contains preponderatingly the corresponding quaternary salt.

In case some glycols should be present in the reaction product, having been produced by saponification, which would disturb the further working up, they may be separated, for example, by conversion into the acetals by means of an aldehyde or a ketone and removed in the form of a body insoluble or sparingly soluble in water, or extracted by means of a solvent.

Instead of the epichlorhydrin used in the examples other epihalogenhydrins may be used, for instance in the form in which they are obtained by the action of perbenzoic acid on halogen olefines. Furthermore, instead of the epichlorhydrin an alkylene-oxide may be used which, instead of halogen, contains a mineral acid ester group or ester salt group capable of reaction, for instance, sulfuric acid ester, phosphoric acid ester or alkylphosphoric acid ester.

What I claim is:

1. A process of producing a hydroxyalkylated amine salt which contains in the hydroxyalkyl radical besides a hydroxyalkyl group at least one exchangeable radical of an inorganic acid bound in the manner of an ester, which process comprises reacting an alkylene oxide containing at least one exchangeable radical of an inorganic acid bound in the manner of an ester with the salt of a base, the basic element of which is a trivalent nitrogen atom.

2. A process of producing a hydroxyalkylated amine salt which contains in the hydroxyalkyl radical besides a hydroxyalkyl group at least one exchangeable radical of an inorganic acid bound in the manner of an ester, which process comprises reacting an alkylene oxide containing at least one exchangeable radical of an inorganic acid bound in the manner of an ester with the salt of a base the basic element of which is a trivalent nitrogen atom at a temperature of from about 40 to about 100° C.

3. A process of producing a hydroxyalkylated amine salt which contains in the hydroxyalkyl radical besides a hydroxyalkyl group at least one exchangeable radical of an inorganic acid bound in the manner of an ester, which process comprises reacting an alkylene oxide containing at least one exchangeable radical of an inorganic acid bound in the manner of an ester with the salt of a base the basic element of which is a trivalent nitrogen atom in an aqueous solution.

4. A quaternary ammonium salt containing at least two chlorohydroxyalkyl groups linked to one nitrogen atom and corresponding to the following general formula:

Ox being a chlorohydroxyalkyl group, R being a member of the group consisting of the alkyl-, aralkyl- and alkylene radicals and x being an anion.

5. A process of producing a hydroxyalkylated amine salt which contains in the hydroxyalkyl radical besides a hydroxyl group at least one exchangeable radical of an inorganic acid bound in the manner of an ester, which comprises reacting an alkylene-oxide difficultly soluble in aqueous solutions and containing at least one exchangeable radical of an inorganic acid bound in the manner of an ester with a salt of a base the basic element of which is a trivalent nitrogen atom in an aqueous solution containing an emulsifying agent.

6. A process of producing a hydroxyalkylated amine salt which contains in the hydroxyalkyl radical besides a hydroxyl group at least one exchangeable radical of an inorganic acid bound in the manner of an ester, which comprises reacting an alkylene-oxide containing at least one exchangeable radical of an inorganic acid bound in the manner of an ester with a salt of a base the basic element of which is a trivalent nitrogen atom with an anion yielding easily soluble salts in an aqueous solution.

7. A process of producing a hydroxyalkylated amine salt which contains in the hydroxyalkyl radical besides a hydroxyl group at least one exchangeable radical of an inorganic acid bound in the manner of an ester, which comprises reacting an alkylene-oxide containing at least one exchangeable radical of an inorganic acid bound in the manner of an ester with a salt of a base the basic element of which is a trivalent nitrogen atom in an aqueous solution in the presence of an anion selected from the group consisting of the halogen ions and the sulfocyanate ion.

8. A process of producing a hydroxyalkylated amine salt which contains at least one chlorhydroxypropyl radical, which comprises reacting epichlorhydrin with a salt of a base the basic element of which is a trivalent nitrogen atom.

9. A process of producing a hydroxyalkylated salt which contains in the hydroxy-alkyl radical besides a hydroxyl group at least one exchangeable radical of an inorganic acid bound in the manner of an ester, which comprises reacting more than one mol of an alkylene oxide containing at least one exchangeable radical of an inorganic acid bound in the manner of an ester with a salt of an aliphatic monamine, said monamine having a hydrogen atom attached to the nitrogen atom.

10. A process of producing a hydroxypropylated salt which contains in the hydroxy-propyl radical besides a hydroxyl group a halogen atom, which comprises reacting an epihalohydrin with a salt of a strongly basic polyamine.

PAUL SCHLACK.